(12) United States Patent
Ishizuka et al.

(10) Patent No.: US 11,511,934 B2
(45) Date of Patent: Nov. 29, 2022

(54) TANK DEVICE

(71) Applicant: YAMASHIN-FILTER CORP., Kanagawa (JP)

(72) Inventors: Makoto Ishizuka, Kanagawa (JP); Nobuyuki Kitajima, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 503 days.

(21) Appl. No.: 16/594,865

(22) Filed: Oct. 7, 2019

(65) Prior Publication Data

US 2020/0031570 A1 Jan. 30, 2020

Related U.S. Application Data

(63) Continuation of application No. PCT/JP2018/015077, filed on Apr. 10, 2018.

(30) Foreign Application Priority Data

Apr. 18, 2017 (JP) .............................. JP2017-082306
Apr. 28, 2017 (JP) .............................. JP2017-090750

(51) Int. Cl.
*B01D 35/02* (2006.01)
*B65D 88/12* (2006.01)
(Continued)

(52) U.S. Cl.
CPC ....... *B65D 88/128* (2013.01); *B01D 35/0273* (2013.01); *B60K 15/077* (2013.01); *B60K 2015/0772* (2013.01)

(58) Field of Classification Search
CPC .............. B65D 88/128; B01D 35/0273; B01D 35/027; B01D 29/17; B01D 29/21;
(Continued)

(56) References Cited

U.S. PATENT DOCUMENTS

2013/0082062 A1 4/2013 Kawamoto et al.
2015/0083655 A1* 3/2015 Morishita .............. C10G 53/00
210/266

FOREIGN PATENT DOCUMENTS

CN 102917967 A 2/2013
CN 103031870 A 4/2013
(Continued)

OTHER PUBLICATIONS

Office Action issued in Japanese Patent Application No. 2017-090750 dated Dec. 22, 2020, with English Translation (13 pages).
(Continued)

*Primary Examiner* — Waqaas Ali
(74) *Attorney, Agent, or Firm* — Nakanishi IP Associates, LLC

(57) ABSTRACT

Inside a tank body storing a liquid, a return filter is provided protruding downward from an upper surface of the tank body, and a substantially plate-like (plate-shaped) float is also provided that is inserted into the tank body and floats in accordance with change in a liquid surface of the liquid stored in the tank body. The float is provided with an opening larger than a diameter of a filter case, and in a plan view, the float is disposed between the tank body and the filter case.

3 Claims, 11 Drawing Sheets

(51) Int. Cl.
  *B01D 35/027* (2006.01)
  *B60K 15/077* (2006.01)
(58) Field of Classification Search
  CPC .. B01D 29/336; B01D 29/56; B01D 35/0276; B60K 15/077; B60K 2015/0772; F15B 21/041; F15B 1/26
  See application file for complete search history.

(56) References Cited

FOREIGN PATENT DOCUMENTS

| | | |
|---|---|---|
| EP | 2 574 488 A1 | 4/2013 |
| JP | S59-073608 U | 5/1984 |
| JP | S62-066001 U | 4/1987 |
| JP | S63-086033 U | 6/1988 |
| JP | H05-051409 U | 7/1993 |
| JP | H05-321902 A | 12/1993 |
| JP | H06-117401 A | 4/1994 |
| JP | 2000-309945 A | 11/2000 |
| JP | 2009-196660 A | 9/2009 |
| JP | 2009-275877 A | 11/2009 |
| JP | 2013-075607 A | 4/2013 |
| JP | 2015-217698 A | 12/2015 |
| KR | 2013-0090215 A | 8/2013 |
| WO | 2011/129770 A1 | 10/2011 |

OTHER PUBLICATIONS

Office Action issued in Chinese Patent Application No. 201880024088.7 dated Apr. 8, 2021, with English Translation 46 pages).
Extended European Search Report issued in European Patent Application No. 18787554.7, dated Feb. 6, 2020 (8 pages).
International Search Report issued in PCT/JP2018/015077 dated May 22, 2018 with English Translation (6 pages).

* cited by examiner

TANK DEVICE

CROSS-REFERENCE TO RELATED APPLICATIONS

This application is a continuation application of International Patent Application No. PCT/JP2018/015077 filed on Apr. 10, 2018, which claims priority to Japanese Patent Application No. 2017-082306 filed on Apr. 18, 2017 and Japanese Patent Application No. 2017-090750 filed on Apr. 28, 2017, the entire contents of which are incorporated by reference.

TECHNICAL FIELD

The present invention relates to a tank device.

BACKGROUND ART

Patent Document 1 discloses a hydraulic-oil tank device including a tank body with an intake pipe coupled to a lower side portion of the tank body and a return pipe coupled to an upper side portion of the tank body; and a partition plate attached to an internal intermediate portion of the tank body parallel to a bottom plate of the tank body and provided with a filter hole and a multiplicity of holes. When an oil surface is shaken, the oil present below the partition plate is obstructed by the partition plate and has difficulty in migrating upward.

CITATION LIST

Patent Document

Patent Document 1: JP H5-321902 A

When a hydraulic shovel is driven, the height of the oil surface varies significantly. In addition, when the hydraulic shovel is driven on a slope or turned, the oil surface of the hydraulic oil is violently shaken while being tilted. In such a case, the invention described in Patent Document 1 poses a problem in that the oil surface is shaken while lying above the partition plate, precluding prevention of generation of air bubbles on the oil surface.

SUMMARY OF INVENTION

In light of the foregoing, one or more embodiments of the present invention provide a tank device capable of preventing generation of air bubbles on a liquid surface even in a case where the height of the liquid surface fluctuates or the liquid surface is shaken violently.

One or more embodiments of the present invention provide, for example, a tank device including a tank body storing a liquid; a return filter provided inside the tank body and protruding downward from an upper surface of the tank body, the return filter including a filter medium filtering the liquid and a filter case internally provided with the filter medium, the return filter causing the filtered liquid to flow into the tank body; and a substantially plate-like (plate-shaped) float inserted into the tank body and floating in accordance with change in a liquid surface of the liquid stored in the tank body. The float is provided with an opening larger than a diameter of the filter case, and in a plan view, the float is disposed between the tank body and the filter case.

According to the tank device of one or more embodiments of the present invention, the substantially plate-like float floating in accordance with change in the liquid surface of liquid stored in the tank body is positioned between the tank body and the filter case. Thus, even in a case where the height of the liquid surface fluctuates and the liquid surface is shaken violently, the float can prevent turbulence of the liquid surface, thus preventing generation of air bubbles on the liquid surface.

Here, the tank device may include a plurality of string-like bodies (having a string shape, which may include a cable-shape, a wire shape, a rope shape, a chain shape, and a tubular shape, etc.) coupling the float to a bottom surface of the tank body. The tank body may have a substantially rectangular shape in a plan view, and the string-like bodies may be provided near four corners of the tank body. Thus, when a work machine rolls in association with turning of the work machine or the like, the liquid surface is prevented from being tilted, thus allowing prevention of generation of air bubbles on the liquid surface.

Here, the tank device may include a first rod-like (rod-shaped) portion and a second rod-like (rod-shaped) portion coupling two opposite side surfaces of the tank body. Thus, when a work machine rolls in association with turning or the like of the work machine, the liquid surface is prevented from being tilted, thus allowing prevention of generation of air bubbles on the liquid surface.

Here, the tank body may include a first side surface and a second side surface corresponding to the two side surfaces, and a third side surface and a fourth side surface disposed between the first side surface and the second side surface, the third side surface and the fourth side surface may be opposite each other, the first rod-like portion may be provided adjacent to the third side surface, and the second rod-like portion may be provided adjacent to the fourth side. This enables a reduction in moving distance of the float, allowing more reliable prevention of generation of air bubbles on the liquid surface.

One or more embodiments of the present invention provide a tank device, for example, including a tank body storing a liquid; and a return filter provided inside the tank body and protruding downward from an upper surface of the tank body, the return filter including a filter medium filtering the liquid and a filter case internally provided with the filter medium, the return filter causing the filtered liquid to flow into the tank body. Side surfaces of the tank body are provided with a first plate-like portion and a second plate-like portion provided with an opening larger than a diameter of the filter case and being installed substantially parallel to a bottom surface of the tank body, the first plate-like portion and the second plate-like portion being spaced apart at a predetermined distance in a height direction, and in a plan view, the first plate-like portion and a second plate-like portion are disposed between the tank body and the filter case.

According to the tank device of one or more embodiments of the present invention, the side surface of the tank body is provided with the first plate-like portion and the second plate-like portion installed parallel to the bottom surface of the tank body and spaced apart at the predetermined distance in the height direction. The first plate-like portion and the second plate-like portion are each provided with an opening larger than a diameter of the filter case, and in a plan view, the first plate-like portion and the second plate-like portion are disposed between the tank body and the filter case. Thus, even in a case where the height of the liquid surface fluctuates and the liquid surface is shaken violently, the first plate-like portion and the second plate-like portion prevent turbulence of the liquid surface, allowing prevention of generation of air bubbles on the liquid surface.

Here, a flow path for the liquid may be formed between the filter case and the first plate-like portion and the second plate-like portion. Thus, when the liquid surface becomes turbulent, the liquid surface can hit the first plate-like portion and the second plate-like portion, with the liquid being released through the flow path between the filter case and the first plate-like portion and the second plate-like portion.

Here, the first plate-like portion may include a third plate-like (plate-shaped) portion and a fourth plate-like portion, the second plate-like portion may include a fifth plate-like portion and a sixth plate-like portion, the tank body may include a first side surface and a second side surface opposite each other and a third side surface and a fourth side surface opposite each other, the third plate-like portion and the fifth plate-like portion may abut the first side surface, the second side surface, and the third side surface, the fourth plate-like portion and the sixth plate-like portion may abut the first side surface, the second side surface, and the fourth side surface, and a flow path for the liquid may be formed between the third plate-like portion and the fourth plate-like portion and between the fifth plate-like portion and the sixth plate-like portion. Thus, when the work machine rolls in association with turning of the work machine or the like, the liquid surface is prevented from being tilted, thus allowing prevention of generation of air bubbles on the liquid surface.

Here, the tank device may include a plurality of first coupling rods coupling the bottom surface, the third plate-like portion, and the fifth plate-like portion together, and a plurality of second coupling rods coupling the bottom surface, the fourth plate-like portion, and the sixth plate-like portion together. This prevents distortion of the third plate-like portion, the fourth plate-like portion, the fifth plate-like portion, and the sixth plate-like portion, allowing more reliable prevention of generation of air bubbles in the liquid.

According to one or more embodiments of the present invention, air bubbles can be prevented from being generated on the oil surface even in a case where the height of the oil surface fluctuates or the oil surface is shaken violently.

DESCRIPTION OF EMBODIMENTS

Below, detailed description of embodiments of the present invention will be given with reference to drawings. A tank device of the present invention will be described below taking an example of a hydraulic-oil tank device installed in a work machine (for example, a hydraulic device). However, the present invention can be applied to a tank device other than the hydraulic-oil tank device. Additionally, hydraulic oil will be described below as an example of a fluid. However, the present invention is applicable to various fluids other than the hydraulic oil.

First Embodiment

Figure 1:
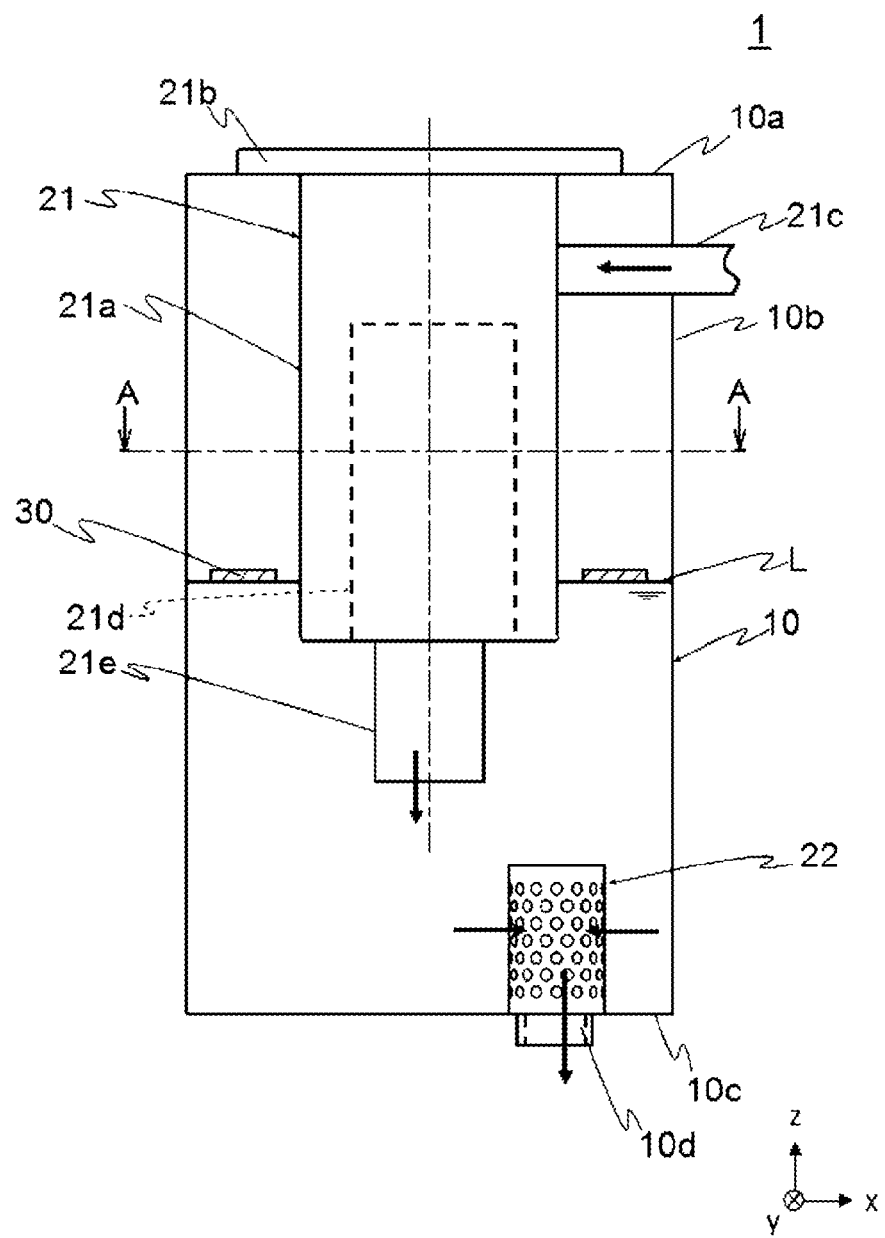
FIG. 1 is a perspective view schematically illustrating a main part of a hydraulic-oil tank device 1, which is an embodiment of the present invention.

FIG. 1 is a perspective view schematically illustrating a main part of a hydraulic-oil tank device 1 in an embodiment of the present invention. The hydraulic-oil tank device 1 is a tank that is provided in a hydraulic circuit for hydraulic oil fed to a hydraulic device and in which the hydraulic oil is stored. In the hydraulic circuit, the hydraulic oil passes through the hydraulic device and is introduced into the hydraulic oil tank 1.

The hydraulic-oil tank device 1 primarily includes a box-shaped tank body 10. The tank body 10 has a substantially rectangular shape in a plan view. The tank body 10 internally forms a cavity and is internally provided with a return filter 21, a suction strainer 22, and a float 30, primarily.

The return filter 21 and an air breather (not illustrated) are provided on an upper surface 10a of the tank body 10. The air breather filters air entering the tank body 10 due to vertical movement of the oil surface to prevent the hydraulic oil from being contaminated with dirt or the like.

A return filter 21 is provided inside the tank body 10 to protrude downward from the upper surface 10a of the tank body 10. The return filter 21 primarily includes a filter case 21a, a lid member 21b, an inflow pipe 21c, a filter medium 21d, and an outflow pipe 21e.

The filter case 21a is a member having a bottomed substantially cylindrical shape and is formed from metal. The filter case 21a is inserted into a hole (not illustrated) formed in the upper surface 10a of the tank body 10. The lid member 21b is provided on an outer side (+z side) of the upper surface 10a so as to cover the hole. The inflow pipe 21c is provided on a side surface of the filter case 21a, and the outflow pipe 21e is provided on a bottom surface of the filter case 21a.

The inflow pipe 21c extends through a side surface 10b of the tank body 10, and the hydraulic oil flows into the filter case 21a via the inflow pipe 21c.

The filter medium 21d is provided inside the filter case 21a. The filter medium 21d is a member filtering the hydraulic oil and has a substantially cylindrical shape with a thickness in a radial direction. The filter medium 21d is formed by pleating filter paper formed from synthetic resin, paper, or the like and connecting both ends of the pleated filter paper to round the filter paper into a cylindrical shape.

The hydraulic oil filtered by the filter medium 21d flows through the outflow pipe 21e into the tank body 10.

The suction strainer 22 is a member preventing entry of foreign substances into a hydraulic pump and is provided near a lower end of the tank body 10. In the present embodiment, an outflow port 10d is provided on a bottom surface 10c to cause the hydraulic oil in the tank body 10 to flow out to the hydraulic pump (not illustrated), and the suction strainer 22 is provided on an upper side (+z side) of the outflow port 10d.

The suction strainer 22 includes a substantially cylindrical filter medium. The filter medium is, for example, a metal plate-like member provided with a large number of holes and is formed into a substantially cylindrical shape by connecting both ends of the filter medium to round the filter medium into a cylindrical shape. The outflow port 10d is fitted into a hollow portion of the suction strainer 22 to position and fix the suction strainer 22 in the tank body 10.

The hydraulic oil stored inside the tank body 10 is sucked into the hydraulic pump (not illustrated) via the suction strainer 22 and fed back to the hydraulic device.

The float 30 is a substantially plate-like member inserted into the tank body 10. The float 30 is formed to float on the hydraulic oil and floats due to changes in an oil surface L of the hydraulic oil stored in the tank body 10. In the present embodiment, the float 30 is formed from a material having a smaller specific gravity than the hydraulic oil. However, a material having a specific gravity larger than that of the hydraulic oil may be used, and a cavity may be formed inside the material to make the float 30 smaller in specific gravity than the hydraulic oil.

Figure 2:
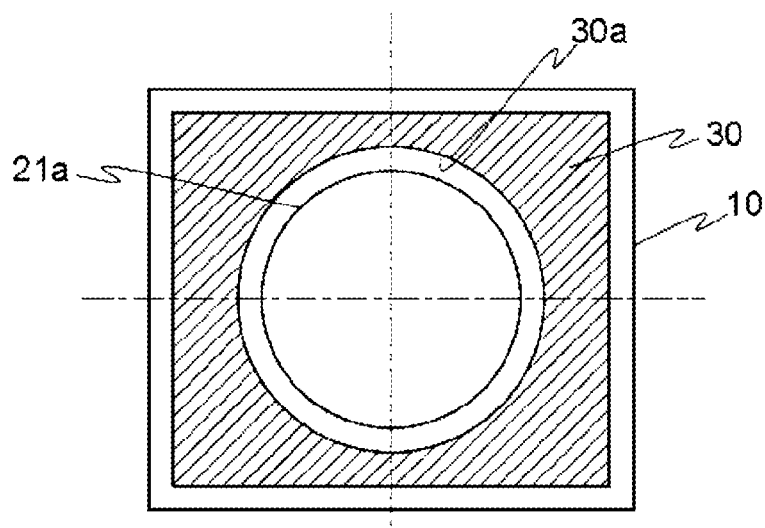
FIG. 2 is a cross-sectional view taken along line A-A in FIG. 1.
Figure 2:
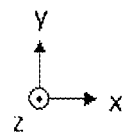

FIG. 2 is a cross-sectional view taken along line A-A in FIG. 1. For the purpose of illustration, the float 30 is hatched in the figure. An opening 30a that is larger than the diameter of the filter case 21a is formed substantially in the center of the float 30. The float 30 is disposed between the tank body 10 and the filter case 21a in a plan view (as viewed in a +z-direction).

Now, functions of the hydraulic-oil tank device 1 thus configured will be described. Arrows in FIGS. 1 and 2 indicate a flow of the hydraulic oil.

The hydraulic oil flows through the hydraulic circuit during operation of the hydraulic device. As illustrated in FIG. 1, the hydraulic oil flows into the return filter 21 via the inflow pipe 21c. The hydraulic oil filtered by the return filter 21 flows out through the outflow pipe 21e to the tank body 10.

The hydraulic oil having flowed out to the tank body 10 is stored inside the tank body 10. In a case where the float 30 does not float on the oil surface L, the tank body 10 may vibrate due to vibration of the work machine or the like to make the oil surface L turbulent, thus generating air bubbles in the hydraulic oil (the oil surface L may be subjected to fine vibration to entrain air bubbles). In contrast, in the hydraulic-oil tank device 1, the float 30 floating on the oil surface L can prevent turbulence of the oil surface L and generation of air bubbles.

In addition, for example, when driving of a hydraulic shovel or the like provided in the work machine is started, the height of the oil surface L suddenly changes. Since the float 30 floats on the hydraulic oil, in spite of fluctuations in the oil surface L, the float 30 moves following the oil surface L. Thus, even in a case where the oil surface L becomes turbulent due to a change in the oil surface L, the turbulence of the oil surface L can be suppressed, preventing generation of air bubbles.

The hydraulic oil stored in the tank body 10 flows out of the tank body 10 through the suction strainer 22 and the outflow port 10d. In the hydraulic-oil tank device 1, the float 30 prevents generation of air bubbles on the oil surface L to reduce air bubbles contained in the hydraulic oil stored in the tank body 10 and air bubbles flowing out of the tank body 10, preventing defects caused by suction of air by the pump and the like.

According to the present embodiment, even in a case where the height of the oil surface L fluctuates or the oil surface L is shaken violently, generation of air bubbles on the oil surface L can be prevented.

Second Embodiment

In the first embodiment of the present invention, the float 30 is used to prevent generation of air bubbles on the oil surface L, but a method for preventing generation of air bubbles on the oil surface L is not limited to this.

A second embodiment of the present invention is a configuration preventing generation of air bubbles on the oil surface L by using a plurality of plate-like portions. Hereinafter, a hydraulic-oil tank device 2 according to the second embodiment of the present invention will be described. Note that the same components as those in the first embodiment are denoted by the same reference signs, and description of the components is omitted.

The hydraulic-oil tank device 2 primarily includes a box-shaped tank body 10A. The tank body 10A has a substantially rectangular shape in a plan view. The tank body 10 internally forms a cavity and is internally provided with the return filter 21 and the suction strainer 22, primarily.

Plate-like portions 12, 13, and 14 are provided on the side surface 10b of the tank body 10A. The plate-like portions 12, 13, and 14 are substantially parallel to the bottom surface 10c and are provided at predetermined intervals h in the z-direction (height direction). The plate-like portions 12, 13, and 14 have a substantially identical shape in a plan view. Thus, only the plate-like portion 13 will be described below, and description of the plate-like portions 12 and 14 is be omitted.

Figure 3:
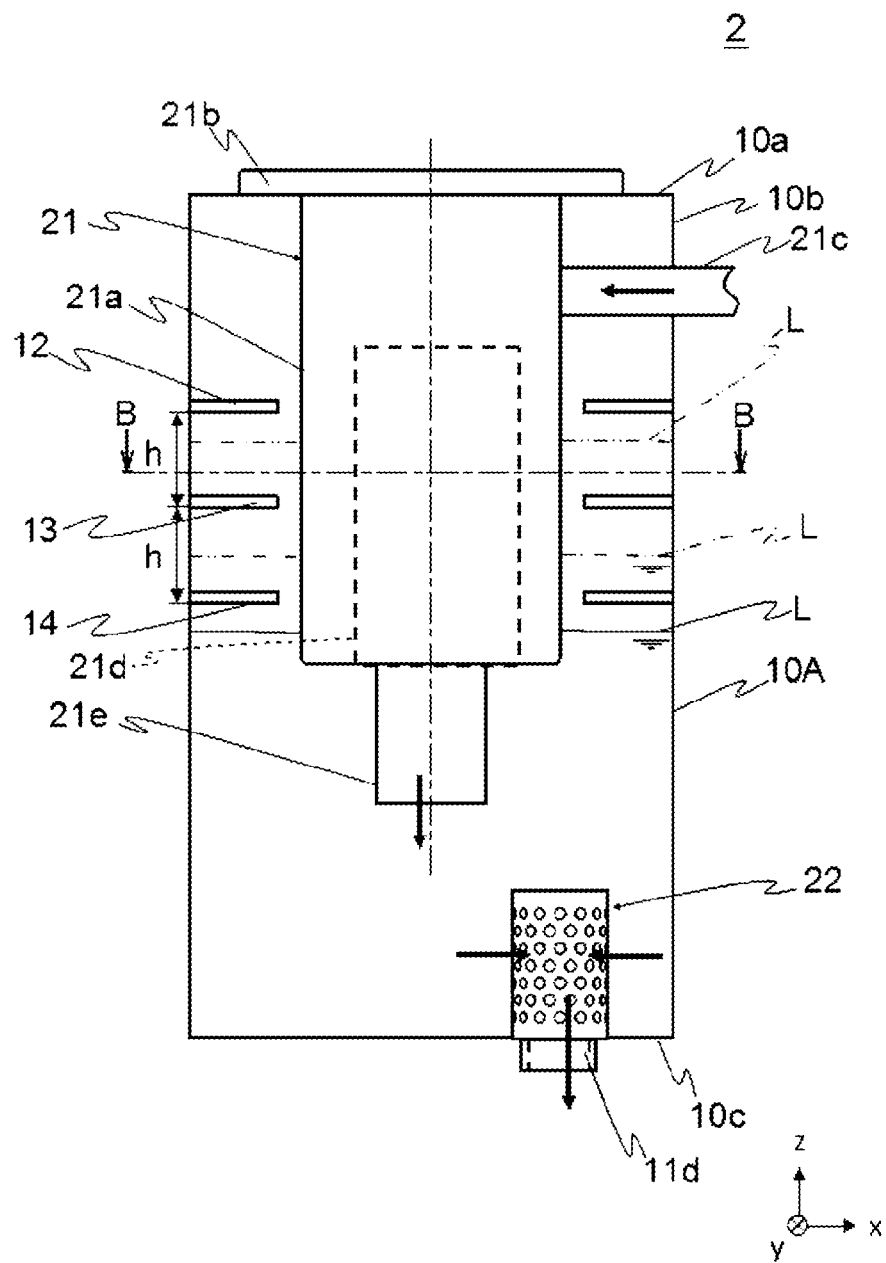
FIG. 3 is a perspective view schematically illustrating a main part of a hydraulic-oil tank device 2, which is an embodiment of the present invention.
Figure 4:
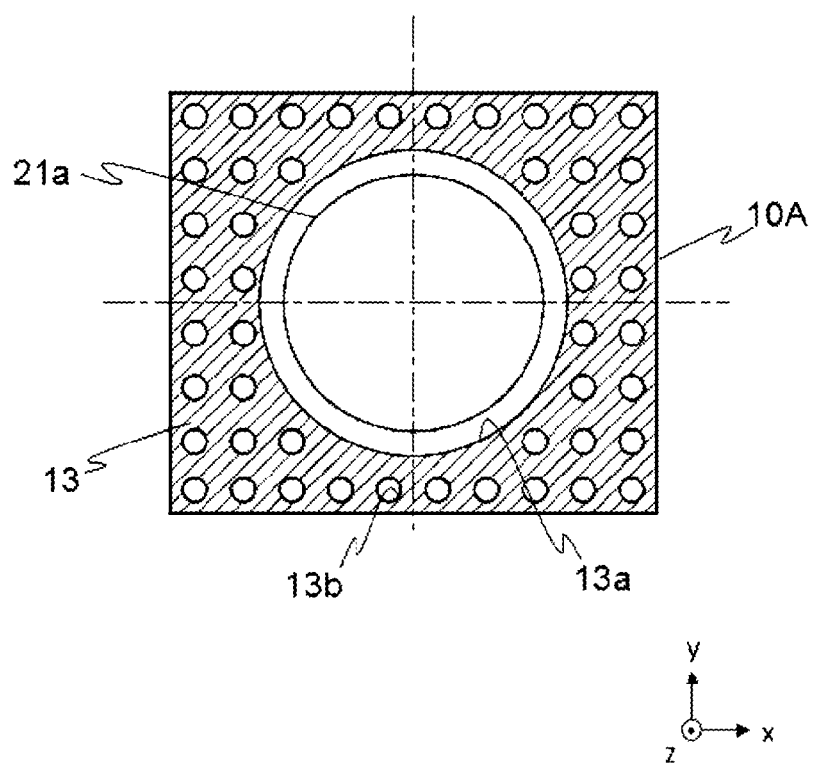
FIG. 4 is a cross-sectional view taken along line B-B in FIG. 3.

FIG. 4 is a cross-sectional view taken along line B-B in FIG. 3. For the purpose of illustration, the plate-like portion 13 is hatched in the figure. An opening 13a that is larger than the diameter of the filter case 21a is formed substantially in the center of the plate-like portion 13. The filter case 21a is inserted into the opening 13a. Thus, the plate-like portion 13 is disposed between the tank body 10A and the filter case 21a in a plan view.

A gap serving as a flow path for the hydraulic oil is formed between the opening 13a and the filter case 21a. Additionally, a plurality of holes 13b serving as flow paths for the hydraulic oil are formed in the plate-like portion 13. However, the holes 13b are not essential.

Now, functions of the hydraulic-oil tank device 2 thus configured will be described. Arrows in FIG. 3 indicate a flow of the hydraulic oil. The hydraulic oil flows into the return filter 21 via the inflow pipe 21c. The hydraulic oil filtered by the return filter 21 flows out through the outflow pipe 21e to the tank body 10A.

The hydraulic oil having flowed out to the tank body 10A is stored inside the tank body 10A. In a case where the tank body 10A vibrates due to a vibration of the work machine or the like, the oil surface L hits any of the plate-like portions 12, 13, and 14.

For example, in a case where the oil surface L is low (see a solid line in FIG. 3), the oil surface L hits the plate-like portion 14. The oil surface L rises (see a dashed-double dotted line in FIG. 3) and hits the plate-like portion 12 or the plate-like portion 13. Then, the hydraulic oil is released via the flow path between the filter case 21a and the plate-like portions 12, 13, and 14.

According to the present embodiment, regardless of the height of the oil surface L, the oil surface L is caused to hit any of the plate-like portions 12, 13, and 14 when the oil surface L becomes turbulent. This allows prevention of generation of air bubbles on the oil surface L.

Note that, in the present embodiment, three plate-like portions 12, 13, and 14 are provided, but the number of plate-like portions is not limited to three. In addition, the intervals h between the plate-like portions 12, 13, and 14 are not limited to the intervals in the illustrated configuration and can be optionally set according to the magnitude of fluctuation of the oil surface L.

Third Embodiment

In the first embodiment of the present invention, the float 30 is used to prevent generation of air bubbles on the oil surface L. However, the third embodiment of the present invention is a configuration using the float 30 to also prevent generation of air bubbles on the oil surface L during rolling associated with turning of a work machine or the like. Hereinafter, a hydraulic-oil tank device 3 according to the third embodiment of the present invention will be described. Note that the same components as those in the first embodiment are denoted by the same reference signs, and description of the components is omitted.

Figure 5:
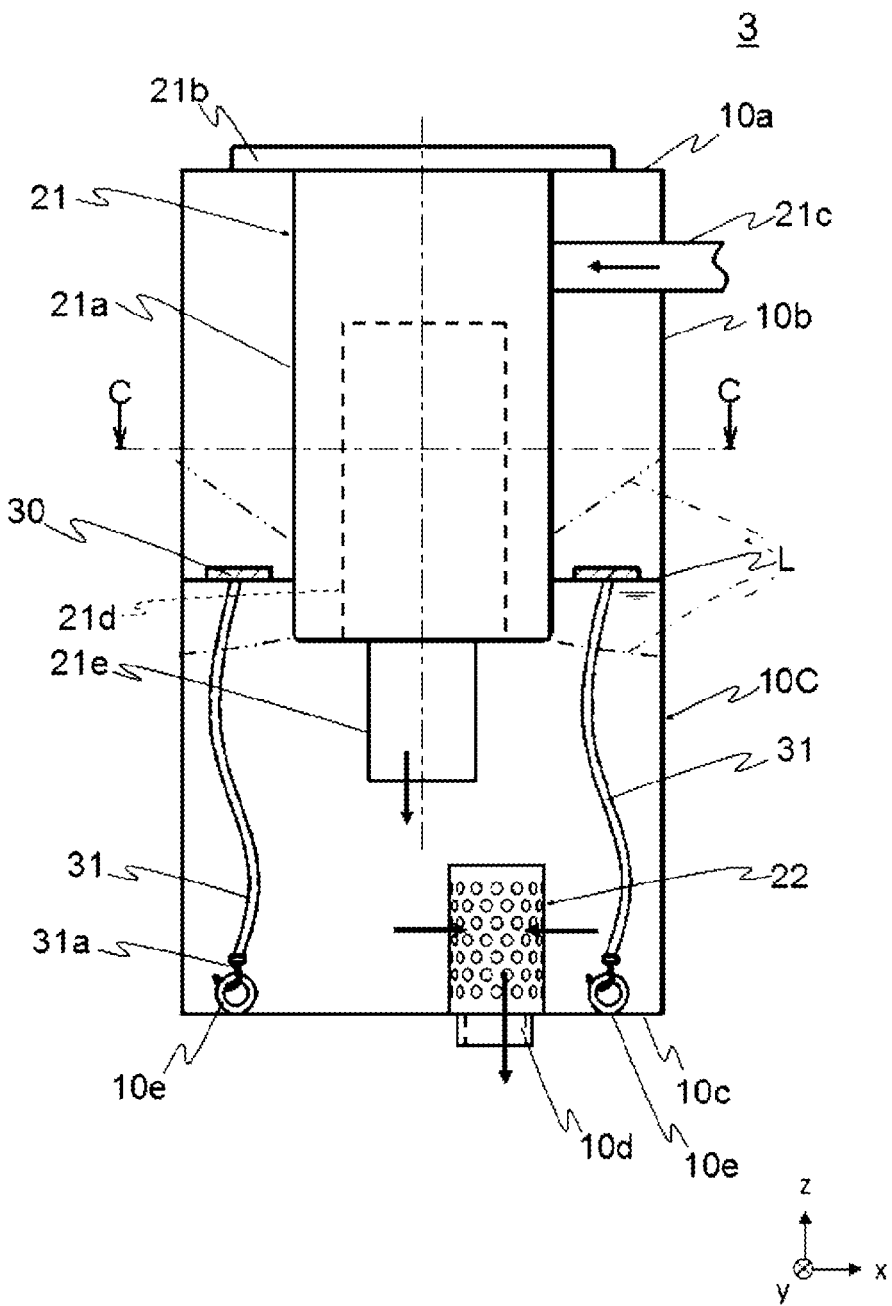
FIG. 5 is a perspective view schematically illustrating a main part of a hydraulic-oil tank device 3.

FIG. 5 is a perspective view schematically illustrating a main part of the hydraulic-oil tank device 3. The hydraulic-oil tank device 3 includes a tank body 10C having a substantially rectangular shape in a plan view. The tank body 10C is internally provided with the return filter 21, the suction strainer 22, the float 30, and string-like bodies 31.

The string-like bodies 31 are members coupling the float 30 to the bottom surface 10c of the tank body 10C. One end of each of the string-like bodies 31 is provided on the float 30, and the other end of the string-like body 31 is provided on a fixing portion 10e formed on the bottom surface 10c. Examples of the string-like bodies include chains, wires, and ropes.

Figure 6:
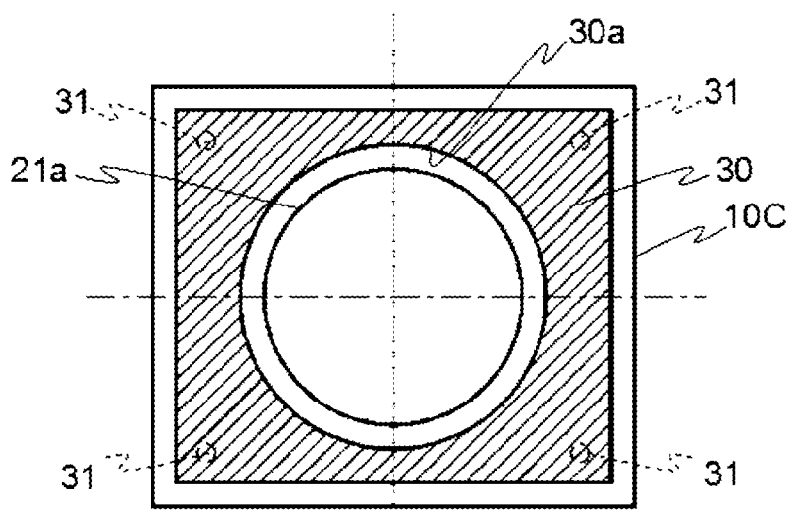
FIG. 6 is a cross-sectional view taken along line C-C in FIG. 3.

FIG. 6 is a cross-sectional view taken along line C-C in FIG. 5. For the purpose of illustration, the float 30 is hatched in the figure. As illustrated in FIG. 6, the string-like bodies 31 are provided near four corners of the tank body 10.

Now, functions of the return filter 3 thus configured will be described. The hydraulic oil having flowed out to the tank body 10C is stored inside the tank body 10C.

In a case where the float 30 does not float on the oil surface L, the oil surface L may be tilted due to a centrifugal force associated with rolling of the hydraulic-oil tank device 3 caused by turning of the work machine or the like (see a dashed-double dotted line in FIG. 3), and the oil surface L may be ruffled to generate air bubbles in the hydraulic oil (the oil surface L is subjected to fine vibration to entrain air bubbles).

In the hydraulic-oil tank device 3, the float 30 floats on the oil surface L, and the float 30 is coupled to the bottom surface 10c with the string-like bodies 31. Thus, movement of the float 30 in the vertical direction (z-direction) is limited. In addition, since the float 30 floats on the hydraulic oil, the oil surface L moves following the float 30. Accordingly, even in a case where the hydraulic-oil tank device 3 rolls, movement of the oil surface L is blocked by the float 30 to prevent the oil surface L from being tilted. Thus, generation of air bubbles on the oil surface L can be prevented.

Fourth Embodiment

In the first embodiment of the present invention, the float 30 is used to prevent generation of air bubbles on the oil surface L. However, the fourth embodiment of the present invention is a configuration using the float 30 to also prevent generation of air bubbles on the oil surface L during rolling associated with turning of the work machine or the like. A hydraulic-oil tank device 4 according to the fourth embodiment will be described below. The same components as those in the first to third embodiments are denoted by the same reference signs, and description of the components is omitted.

Figure 7:
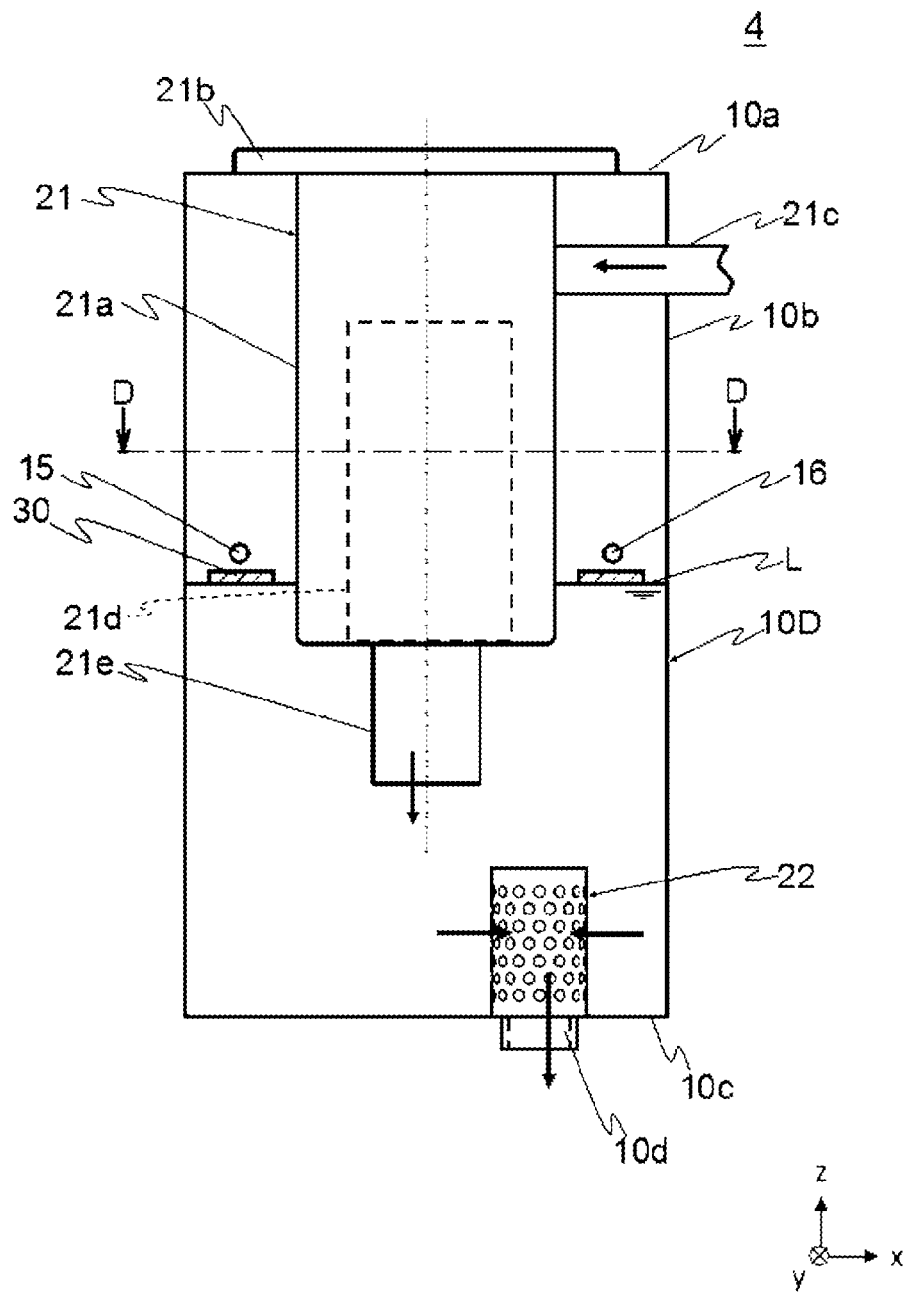
FIG. 7 is a perspective view schematically illustrating a main part of a hydraulic-oil tank device 4.

FIG. 7 is a perspective view schematically illustrating a main part of the hydraulic-oil tank device 4. The hydraulic-oil tank device 4 includes a tank body 10D having a substantially rectangular shape in a plan view and is internally provided with the return filter 21, the suction strainer 22, and the float 30, primarily.

Two rod-like portions 15 and 16 are provided in the tank body 10D. The rod-like portions 15 and 16 are, for example, solid round rods and are provided on the upper side (+z side) of the float 30.

Figure 8:
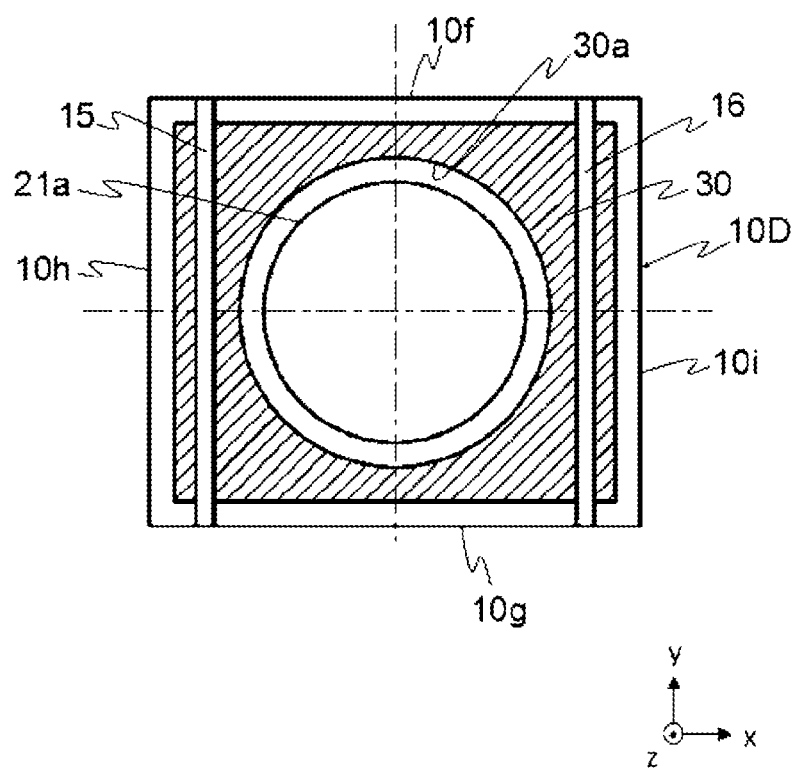
FIG. 8 is a cross-sectional view taken along line D-D in FIG. 7.

FIG. 8 is a cross-sectional view taken along line D-D in FIG. 7. For the purpose of illustration, the float 30 is hatched in the figure. As illustrated in FIG. 8, the rod-like portions 15 and 16 couple two opposite side surfaces 10f and 10g of the tank body 10D together.

Side surfaces 10h and 10i are disposed between the side surfaces 10f and 10g. The side surface 10h and the side surface 10i are opposite each other. The rod-like portion 15 is provided adjacent to the side surface 10h, and the rod-like portion 16 is provided adjacent to the side surface 10i. As described above, the rod-like portions 15 and 16 are provided near both ends, in an x-direction, of the tank body 10D.

Note that in the present embodiment, the rod-like portions 15 and 16 are provided near both ends, in the x-direction, of the tank body 10D, but the rod-like portions 15 and 16 may be provided near both ends, in a y-direction, of the tank body 10D. Additionally, four rod-like portions may be assembled substantially in a well curb shape.

Now, functions of the hydraulic-oil tank device 4 thus configured will be described. The hydraulic oil having flowed out to the tank body 10D is stored inside the tank body 10D.

In the hydraulic-oil tank device 4, the rod-like portions 15 and 16 limit movement of the float 30 in the vertical direction (z-direction). Accordingly, even in a case where the hydraulic-oil tank device 4 rolls, movement of the oil surface L is blocked by the float 30, that is, the rod-like portions 15 and 16, preventing the oil surface L from being tilted. Thus, generation of air bubbles on the oil surface L can be prevented. In particular, by providing the rod-like portions 15 and 16 near both ends in the x-direction, the moving distance of the float 30 can be reduced, thus reliably preventing generation of air bubbles on the oil surface L.

Fifth Embodiment

In the second embodiment of the present invention, the plurality of plate-like portions 12, 13, and 14 are used to prevent generation of air bubbles on the oil surface L. However, the fifth embodiment of the present invention is a configuration using the plurality of plate-like portions to also prevent generation of air bubbles on the oil surface L during rolling associated with turning of the work machine or the like. A hydraulic-oil tank device 5 according to the fifth embodiment will be described below. The same components as those in the second embodiment are denoted by the same reference signs, and description of the components is omitted.

Figure 9:
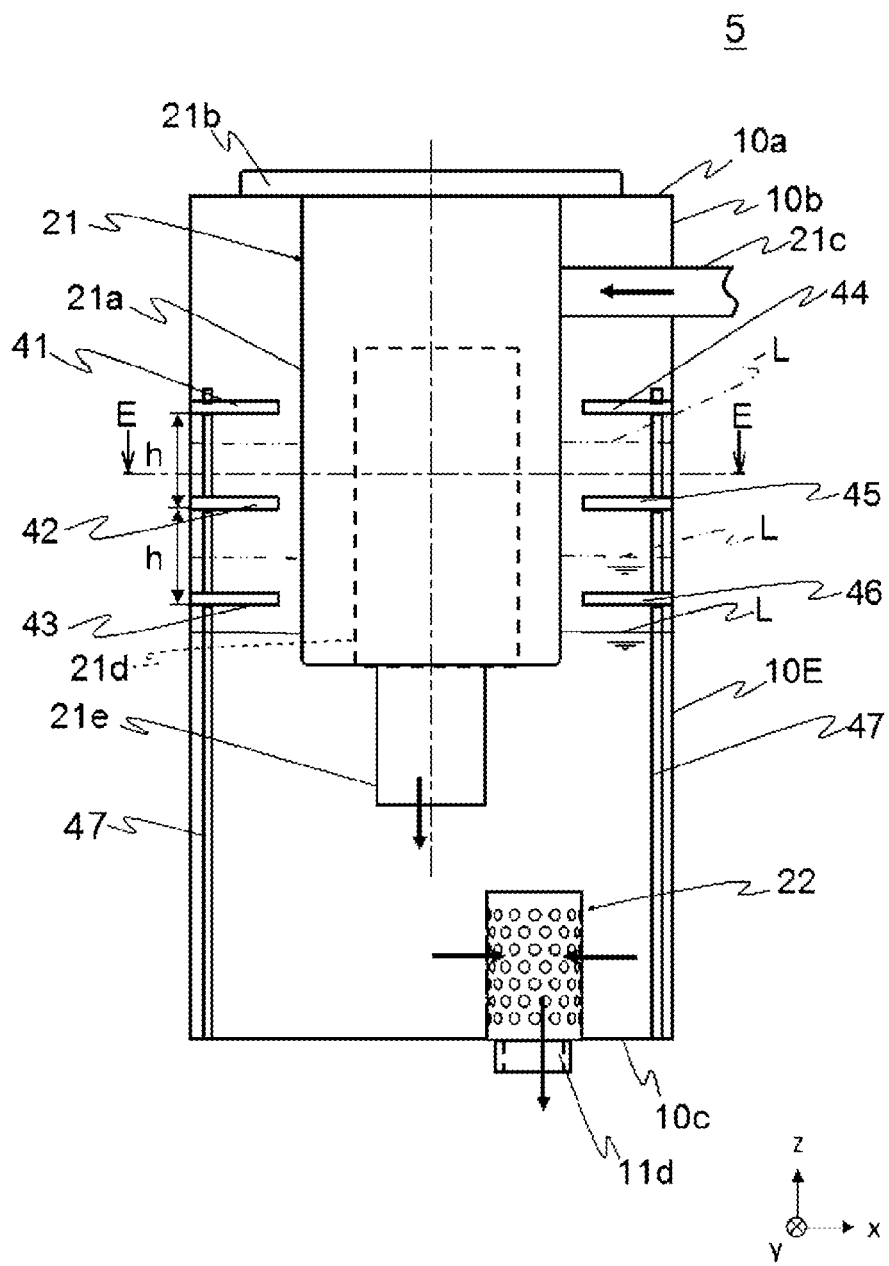
FIG. 9 is a perspective view schematically illustrating a main part of a hydraulic-oil tank device 5.

FIG. 9 is a perspective view schematically illustrating a main part of the hydraulic-oil tank device 5. The hydraulic-oil tank device 5 includes a tank body 10E having a substantially rectangular shape in a plan view and is internally provided with the return filter 21, the suction strainer 22, and the float 30, primarily.

Plate-like portions 41, 42, 43, 44, 45, and 46 are provided on side surfaces of the tank body 10E. The plate-like portions 41, 42, 43, 44, 45, and 46 are substantially parallel to the bottom surface 10c and are provided at predetermined intervals h in the z-direction (height direction).

The plate-like portion 41 and the plate-like portion 44 are substantially identical in position in the height direction (z-direction), the plate-like portion 42 and the plate-like portion 45 are substantially identical in position in the height direction (z-direction), and the plate-like portion 43 and the plate-like portion 46 are substantially identical in position in the height direction (z-direction). In addition, the plate-like portion 41 and the plate-like portion 44 are installed with a gap between the portions 41 and 44, the plate-like portion 42 and the plate-like portion 45 are installed with a gap between the portions 42 and 45, and the plate-like portion 43 and the plate-like portion 46 are installed with a gap between the portions 43 and 46.

The plate-like portions 41, 42, and 43 have a substantially identical shape in a plan view, and the plate-like portions 44, 45, and 46 have a substantially identical shape in a plan view. Thus, only the plate-like portions 42 and 45 will be described below, and description of the plate-like portions 41, 43, 44, and 46 is omitted.

Rod-like portions 47 couple the plate-like portion 41, the plate-like portion 42, and the plate-like portion 43 and the bottom surface 10c together. In addition, the rod-like portions 47 couple the plate-like portion 44, the plate-like portion 45, the plate-like portion 46, and the bottom surface 10c together.

Figure 10:
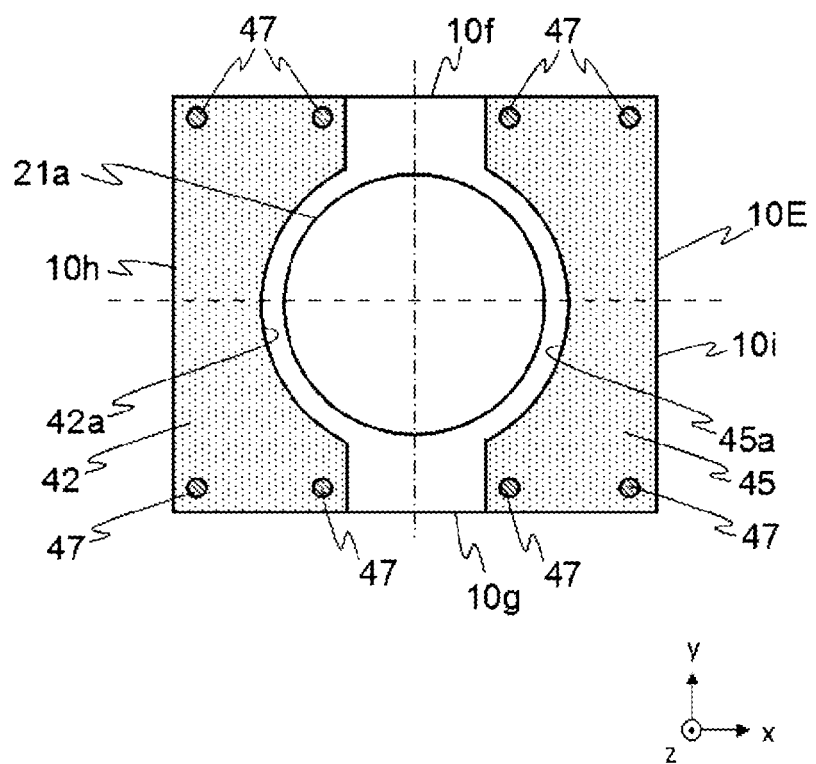
FIG. 10 is a cross-sectional view taken along line E-E in FIG. 9.

FIG. 10 is a cross-sectional view taken along line E-E in FIG. 9. For the purpose of illustration, the plate-like portions 42 and 45 are hatched in the figure. The plate-like portion 42 abuts the side surface 10f, 10g, and 10h. In addition, the plate-like portion 45 abuts the side surfaces 10f, 10g, and 10i. The plate-like portions 42 and 45 are members having a substantially rectangular shape in a plan view, and recess portion 42a and 45a into which the filter case 21a is inserted are each formed substantially in the center of a corresponding one of the plate-like portions 42 and 45. In other words, the plate-like portions 42 are 45 are disposed between the tank body 10E and the filter case 21a in a plan view.

A gap is formed between the filter case 21a and each of the recess portions 42a and 45a and serves as a flow path for the hydraulic oil. Additionally, a gap is formed between the plate-like portion 42 and the plate-like portion 45 and serves as a flow path for the hydraulic oil.

The rod-like portions 47 are, for example, solid round rods and are provided near four corners of each of the plate-like portions 42 and 45 in a plan view. Thus, for example, strain of the plate-like portions 42 and 45 in the vertical direction is prevented.

Now, functions of the hydraulic-oil tank device 5 thus configured will be described. The hydraulic oil having flowed out to the tank body 10E is stored inside the tank body 10E.

In the hydraulic oil tank device 5, even in a case where the oil surface L acts to tilt due to a centrifugal force associated with rolling of the hydraulic-oil tank device 5 caused by turning of the work machine or the like, the oil surface L hits the plate-like portions 41, 42, 43, 44, 45, and 46 and is prevented from moving in the z-direction.

In particular, the plate-like portions 41, 42, and 43 abut the side surfaces 10f, 10g, and 10h, the plate-like portions 44, 45, and 46 abut the side surfaces 10f, 10g, and 10i, and no holes are formed in the plate-like portions 41, 42, 43, 44, 45, and 46. Thus, no gap serving as a flow path for the hydraulic oil is present near the side surfaces 10f, 10g, 10h, and 10i. Thus, the oil surface L is prevented from being tilted, thus allowing prevention of generation of air bubbles on the oil surface L.

In addition, since the plate-like portions 41, 42, and 43 and the plate-like portions 44, 45, and 46 are coupled to the bottom surface 10c by the rod-like portions 47, the plate-like portions 41, 42, 43, 44, 45, and 46 are prevented from being deformed even in a case where the hydraulic oil passing through the gap serving as a flow path applies a force to the plate-like portions 41, 42, 43, 44, 45, and 46. Thus, this configuration allows prevention of generation of air bubbles in the hydraulic oil, caused by vibration of the plate-like portions 41, 42, 43, 44, 45, and 46.

Note that in the present embodiment, the plate-like portions 41, 42, 43, 44, 45, and 46 are each a member having a substantially rectangular shape in a plan view and including the recess portion formed substantially in the center of the plate-like portion and into which the filter case 21a is inserted, but the shape of the plate-like portions 41, 42, 43, 44, 45, and 46 is not limited to this.

Figure 11:
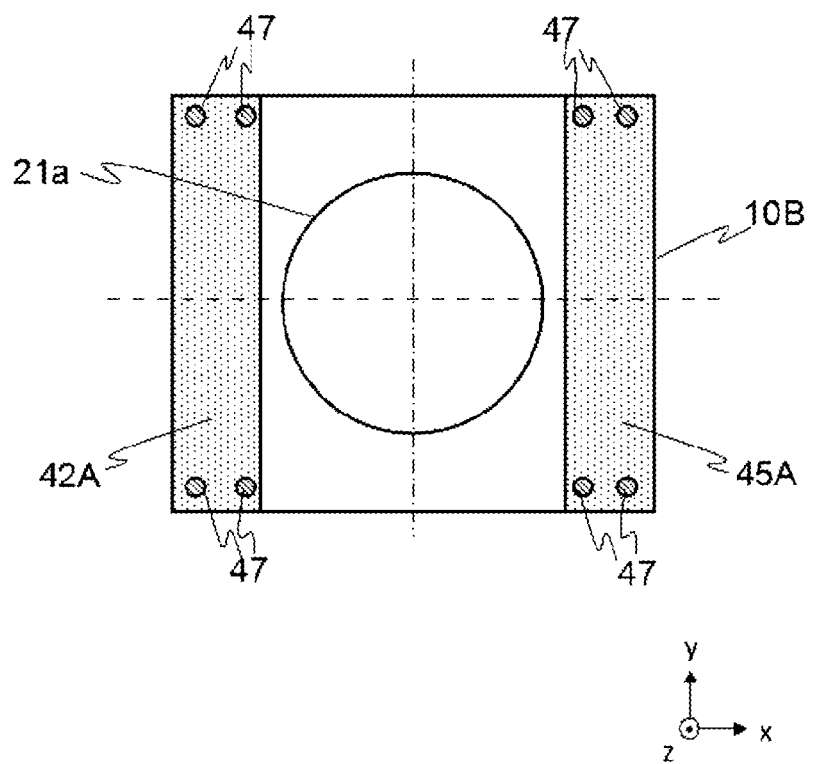
FIG. 11 is a diagram schematically illustrating a hydraulic-oil tank device 5A according to a modified example.

FIG. 11 is a diagram schematically illustrating a hydraulic-oil tank device 5A according to a modified example. For the purpose of illustration, plate-like portions 42A and 45A are hatched in the figure. The plate-like portion 42A abuts the side surfaces 10f, 10g, and 10h. In addition, the plate-like portion 45A abuts the side surfaces 10f, 10g, and 10i. The plate-like portions 42A and 45A are each a member having a substantially rectangular shape in a plan view, and a gap serving as a flow path for the hydraulic oil is formed between the plate-like portion 42A and the plate-like portion 45A. The rod-like portions 47 are provided near four corners of each of the plate-like portions 42A and 45A in a plan view.

Embodiments of the invention have been described in detail with reference to the drawings. However, specific configurations are not limited to the embodiments, and changes in the design or the like are also included within a scope which does not depart from the gist of the invention. For example, the above examples have been explained in detail in order to facilitate understanding of the present invention and are not necessarily limited to examples provided with the entirety of the configuration described above. In addition, the configuration of an embodiment may be partially replaced with the configuration of a different embodiment, or the configuration of the different embodiment may be added to, deleted from, or replaced with the configuration of the embodiment.

Additionally, the term "substantially" in the present invention is not to be understood as merely being strictly the same and is a concept that includes variations and modifications to an extent that does not result in loss in identity. For example, the term "substantially orthogonal" is not limited to being strictly orthogonal and is a concept that includes errors of several degrees, for example. Further, simple expressions such as orthogonal, parallel, and identical are not to be understood as merely being strictly orthogonal, parallel, identical, and the like, and include being substantially parallel, substantially orthogonal, substantially identical, and the like.

Furthermore, the meaning of the term "vicinity" in the present invention includes a range of regions (which can be determined as desired) near a position serving as a reference. For example, the term "a vicinity of an end" refers to a range of regions near the end and is a concept indicating that the end may or may not be included.

REFERENCE SIGNS LIST 1, 2, 3, 4, 5, 5A: Hydraulic-oil tank device
10, 10A, 10B, 10C, 10D, 10E: Tank body
10a: upper surface
10b, 10f, 10g, 10h, 10i: Side surface
10c: Bottom surface
10d: Outflow port
10e: Fixing portion
12, 13, 14: Plate-like (Plate-shaped) Portion
15, 16: Rod-like (Rod-shaped) portion
13a: Opening
13b: Hole
21: Return filter
21a: Filter case
21b: Lid member
21c: Inflow pipe
21d: Filter medium
21e: Outflow pipe
22: Suction strainer
30: Float
30a: Opening
31: String-like (String-shaped) body
41, 42, 42A, 43, 44, 45, 45A, 46: Plate-like (Plate-shaped) portion
42a, 45a: Recess portion
47: Rod-like (Rod-shaped) portion

The invention claimed is:

1. A tank device comprising:
a tank body storing a liquid; and
a return filter provided inside the tank body and protruding downward from an upper surface of the tank body, the return filter including a filter medium filtering the liquid and a filter case internally provided with the filter medium, the return filter causing the filtered liquid to flow into the tank body,
wherein side surfaces of the tank body are provided with a first plate-shaped portion and a second plate-shaped portion provided with an opening larger than a diameter of the filter case and being installed parallel to a bottom surface of the tank body;
the first plate-shaped portion and the second plate-shaped portion are spaced apart at a predetermined distance in a height direction;
in a side view, the first plate-shaped portion and the second plate-shaped portion extend in parallel with one another, and cross the filter medium;
in a plan view, the first plate-shaped portion and the second plate-shaped portion are disposed between the tank body and the filter case, and
in the plan view, the first plate-shaped portion and the second plate-shaped portion are non-overlapped with the filter case wherein the first plate-shaped portion is divided into a third plate-shaped portion and a fourth plate-shaped portion, the second plate-shaped portion is divided into a fifth plate shaped portion and a sixth plate-shaped portion, in the plan view, a third plate-shaped portion and a fourth plate-shaped portion are non-overlapped with each other, in the plan view, a fifth plate-shaped portion and a sixth plate-shaped portion are non-overlapped with each other, the tank body includes a first side surface and a second side surface opposite each other and a third side surface and a fourth side surface opposite each other, the third plate-shaped portion and the fifth plate-shaped portion abut the first side surface, the second side surface, and the third side surface, the fourth plate-shaped portion and the sixth plate-shaped portion abut the first side surface, the second side surface, and the fourth side surface, and
a flow path for the liquid is formed between the third plate-shaped portion and the fourth plate-shaped portion and between the fifth plate-shaped portion and the sixth plate-shaped portion.

2. The tank device according to claim 1, wherein a flow path for the liquid is formed between the filter case and the first plate-shaped portion and the second plate-shaped portion.

3. The tank device according to claim 1 comprising:
a plurality of first coupling rods coupling the bottom surface, the third plate-shaped portion, and the fifth plate-shaped portion together; and
a plurality of second coupling rods coupling the bottom surface, the fourth plate-shaped portion, and the sixth plate-shaped portion together.

* * * * *